(12) United States Patent
Yamazoe

(10) Patent No.: US 12,613,136 B2
(45) Date of Patent: Apr. 28, 2026

(54) MEASUREMENT OPTICAL SYSTEM AND PHOTOMETRIC/COLORIMETRIC DEVICE

(71) Applicant: Konica Minolta, Inc., Tokyo (JP)

(72) Inventor: Junichi Yamazoe, Sakai (JP)

(73) Assignee: KONICA MINOLTA, INC., Tokyo (JP)

( * ) Notice: Subject to any disclaimer, the term of this patent is extended or adjusted under 35 U.S.C. 154(b) by 167 days.

(21) Appl. No.: 18/748,267

(22) Filed: Jun. 20, 2024

(65) Prior Publication Data

US 2025/0020514 A1     Jan. 16, 2025

(30) Foreign Application Priority Data

Jul. 10, 2023    (JP) ................................. 2023-113008

(51) Int. Cl.
G01J 3/51         (2006.01)
G01J 3/02         (2006.01)
(52) U.S. Cl.
CPC .............. G01J 3/51 (2013.01); G01J 3/0208 (2013.01)
(58) Field of Classification Search
CPC ......... G01J 3/51; G01J 3/0208; G01J 1/0411; G01J 1/0448; G01J 1/42; G01J 3/0237; G02B 19/0014; G02B 19/0076
See application file for complete search history.

(56) References Cited

U.S. PATENT DOCUMENTS 6,014,265 A * 1/2000 Kato .............. G02B 15/144107
                                                              359/686

FOREIGN PATENT DOCUMENTS

| | | | |
|---|---|---|---|
| JP | 2010002255 A | * 1/2010 | |
| JP | 2010271246 A | * 12/2010 | |
| WO | WO-2018230177 A1 | * 12/2018 | ............. G02B 13/22 |

* cited by examiner

*Primary Examiner* — Jennifer D Bennett
(74) *Attorney, Agent, or Firm* — LUCAS & MERCANTI, LLP

(57) ABSTRACT

A measurement optical system includes, in order from an object side, a first lens group including at least one lens and having a positive refractive power, a second lens group including at least one lens and having a positive refractive power, a first stop, and a third lens group including at least one lens and having a positive refractive power, and further includes a second stop disposed at least one of in vicinity of a position of a focal point of the first lens group on an image side and in vicinity of a position conjugate with the focal point of the first lens group on the image side with respect to the second and third lens groups. An absolute value of a lateral magnification of the first stop to a plane conjugate with the first stop with respect to the first and second lens groups is 0.7 or less.

8 Claims, 5 Drawing Sheets

|  | FOCAL LENGTH | | |
|---|---|---|---|
|  | FIRST EMBODIMENT | SECOND EMBODIMENT | THIRD EMBODIMENT |
| FIRST LENS GROUP | 49.863 | 31.599 | 40.560 |
| SECOND LENS GROUP | 19.804 | 21.875 | 18.624 |
| THIRD LENS GROUP | 9.218 | 13.748 | 9.832 |
| ENTIRE OPTICAL SYSTEM | −23.612 | −22.596 | −22.828 |

| | INTERVAL ON OPTICAL AXIS | | |
|---|---|---|---|
| | FIRST EMBODIMENT | SECOND EMBODIMENT | THIRD EMBODIMENT |
| MEASUREMENT TARGET PLANE TO FIRST LENS GROUP | 48.912 | 79.163 | 54.437 |
| FIRST LENS GROUP TO FOCAL POINT OF FIRST LENS GROUP | 49.863 | 31.599 | 40.560 |
| FOCAL POINT OF FIRST LENS GROUP TO SECOND LENS GROUP | 7.451 | 18.917 | 12.154 |
| SECOND LENS GROUP TO FIRST STOP | 19.955 | 1.896 | 15.850 |
| FIRST STOP TO THIRD LENS GROUP | 8.523 | 14.131 | 9.281 |
| THIRD LENS GROUP TO SECOND STOP | 11.940 | 15.077 | 11.754 |

MEASUREMENT OPTICAL SYSTEM AND PHOTOMETRIC/COLORIMETRIC DEVICE

CROSS-REFERENCE TO RELATED APPLICATIONS

The entire disclosure of Japanese Patent Application No. 2023-113008, filed on Jul. 10, 2023, including description, claims, drawings and abstract is incorporated herein by reference.

BACKGROUND OF THE INVENTION

Technical Field

The present invention relates to a measurement optical system that guides light from a measurement target object, which is an object to be measured, to a light receiving section, and a photometric/colorimetric device including the same.

Description of Related Art

In recent years, demand for high-contrast display devices, such as organic electro luminescence (EL) displays, has been increasing. In order to achieve high contrast, it is essential to improve low-luminance performance, and for that purpose, a photometric/colorimetric device capable of evaluating low-luminance performance is required. Such a photometric/colorimetric device requires a measurement optical system that can guide a larger amount of light from the measurement target object to the light receiving section.

For example, in a measurement optical system disclosed in WO 2018/230177 A1, a stop is disposed on a plane conjugate with a measurement target plane to define a measurement target region, and an incident plane of a light waveguide is disposed at a focal point of the entire optical system to define the angle of light rays to be taken in. Thus, the amount of light that cannot be incident on the light waveguide due to the off-axis light flux having a large incident angle is reduced.

SUMMARY OF THE INVENTION

However, in the measurement optical system disclosed in WO 2018/230177 A1, regarding the measurement target plane and the stop, which are in a conjugate relationship, the size of the stop to the measurement target plane is large. Therefore, if an attempt is made to expand the measurement target region in order to secure a larger amount of light, the stop also needs to be expanded at the same rate. As a result, the size of the measurement optical system and consequently the size of the entire photometric/colorimetric device increase.

Objects of the present invention include taking in a larger amount of light and suppressing increase in size.

To achieve at least one of the abovementioned objects, according to an aspect of the present invention, a measurement optical system reflecting one aspect of the present invention includes; in order from an object side, a first lens group including at least one lens and having a positive refractive power;

a second lens group including at least one lens and having a positive refractive power;

a first stop; and a third lens group including at least one lens and having a positive refractive power;

wherein the measurement optical system further includes a second stop disposed at least one of (i) in vicinity of a position of a focal point of the first lens group on an image side and (ii) in vicinity of a position conjugate with the focal point of the first lens group on the image side with respect to the second lens group and the third lens group, and wherein an absolute value of a lateral magnification of the first stop to a plane conjugate with the first stop with respect to the first lens group and the second lens group is 0.7 or less.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein.

DETAILED DESCRIPTION

Hereinafter, embodiments of the present invention will be described with reference to the drawings. However, the scope of the invention is not limited to the disclosed embodiments.

First Embodiment

[Overall Configuration of Photometric/Colorimetric Device]

Figure 1:
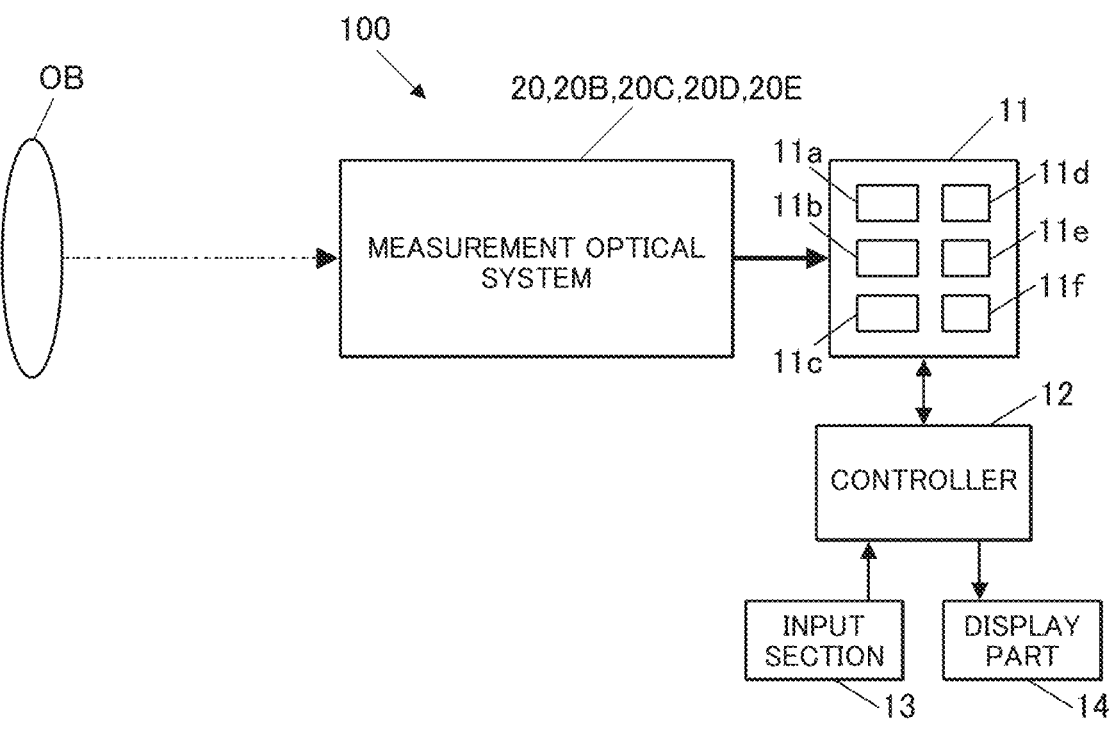
FIG. 1 is a block diagram showing a configuration of a photometric/colorimetric device according to an embodiment(s)

FIG. 1 is a block diagram showing a configuration of a photometric/colorimetric device 100 according to an embodiment(s).

As shown in FIG. 1, the photometric/colorimetric device 100 includes a measurement optical system (optical system for measurement) 20, a light receiving section 11, a controller 12 (hardware processor), an input section 13, and a display part 14.

The measurement optical system 20 receives light from a measurement target object OB and guides the received light to the light receiving section 11. The measurement target object OB is a light emitter in the present embodiment.

Details of the configuration of the measurement optical system 20 will be described later.

The light receiving section 11 receives the light from the measurement target object OB guided by the measurement optical system 20, photoelectrically converts the received light, and outputs an electric signal corresponding to the light intensity. The light receiving section 11 includes, for example, a spectroscopic part that disperses light from the measurement target object OB and a photoelectric conversion element that photoelectrically converts the light dispersed by the spectroscopic part.

Specifically, the light receiving section 11 of the present embodiment is configured to measure the color and the luminance of the measurement target object OB from tristimulus values of XYZ. More specifically, the light receiving section 11 includes three filters of an X filter 11a, a Y filter 11b and a Z filter 11c respectively corresponding to color-matching functions X, Y and Z defined by the Commission Internationale de l'éclairage (CIE), and an X filter light receiving element 11d, a Y filter light receiving element 11e and a Z filter light receiving element 11f that receive the light filtered by the filters 11a, 11b and 11c and photoelectrically convert the light. The X filter 11a, the Y filter 11b and the Z filter 11c correspond to examples of color filters according to the present invention.

In this light receiving section 11, the light from the measurement target object OB is filtered by the X filter 11a and photoelectrically converted by the X filter light receiving element 11d, and an electric signal (X signal) corresponding to the light intensity is output. Similarly, an electric signal (Y signal) is output through the Y filter 11b and the Y filter light receiving element 11e, and an electric signal (Z signal) is output through the Z filter 11c and the Z filter light receiving element 11f. The X signal, the Y signal and the Z signal are output to the controller 12.

The input section 13 is for an operator to make various inputs for operating the photometric/colorimetric device 100. The input section 13 includes, for example, various buttons, an input device, and the like, and outputs input signals corresponding to the operation contents of these to the controller 12.

The display part 14 is, for example, a liquid crystal display, an organic electroluminescence display, or another display. The display part 14 displays various kinds of information such as the measured color and luminance of the measurement target object OB based on a display signal input from the controller 12. Note that the display part 14 may be a touch screen that also serves as part of the input section 13, or may include a speaker capable of audio display (output).

The controller 12 includes, for example, a central processing unit (CPU) and controls the operation of each component of the photometric/colorimetric device 100. For example, the controller 12 causes the measurement optical system 20 and the light receiving section 11 to measure the light from the measurement target object OB based on an operation instruction input from the input section 13. Then, the controller 12 obtains the color and the luminance of the measurement target object OB based on the electrical signals output from the light receiving section 11.

[Configuration of Measurement Optical System]

Figure 2:
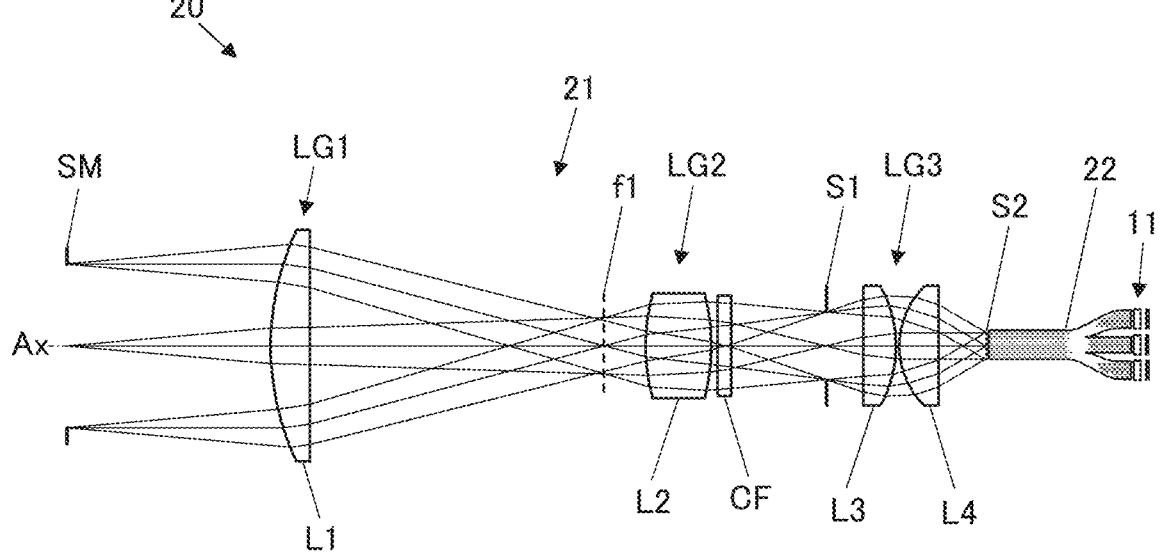
FIG. 2 shows a configuration of a measurement optical system according to a first embodiment.

FIG. 2 shows a configuration of a measurement optical system 20 according to a first embodiment.

As shown in FIG. 2, the measurement optical system 20 includes a lens unit 21 and a light guiding member 22.

The light guiding member 22 guides the light incident from the lens unit 21 to the light receiving section 11. More specifically, the light guiding member 22 has an incident plane disposed in the vicinity of a second stop S2 of the lens unit 21, which will be described later, and guides the light incident on the second stop S2. The light guiding member 22 of the present embodiment is an optical splitter that splits incident light into three in order to guide the light to the three filters of the light receiving section 11. Specifically, the light guiding member 22 is a bundle fiber in which a plurality of bundled optical fiber wires is divided into three bundles in the middle, and incident light incident from one incident plane is emitted from three emission planes. However, the light guiding member 22 is not limited to the bundle fiber, and may be, for example, a light pipe or the like.

The lens unit 21 causes light from the measurement target object OB to be incident on the light guiding member 22. To be specific, the lens unit 21 includes a first lens group LG1, a second lens group LG2, a first stop S1, a third lens group LG3, and a second stop S2 in order from the object side (measurement target object OB side).

The first lens group LG1 includes at least one lens and has a positive refractive power (power). The first lens group LG1 of the present embodiment includes a first lens L1 which is a convex lens. The first lens group LG1 condenses light (light flux or light beams) taken in from the measurement target plane SM near a focal point f1 of the first lens group LG1.

The second lens group LG2 includes at least one lens and has a positive refractive power. The second lens group LG2 of the present embodiment includes a second lens L2 which is a convex lens. The light flux condensed on the focal point f1 of the first lens group LG1 by the first lens group LG1 spreads after passing through the focal point f1. The second lens group LG2 converges the spread light flux toward the first stop S1. In other words, the first lens group LG1 and the second lens group LG2 form an image of an optical image from the measurement target object OB as an intermediate image on the aperture plane of the first stop S1.

The third lens group LG3 includes at least one lens and has a positive refractive power. The third lens group LG3 of the present embodiment includes a third lens L3 which is a convex lens and a fourth lens L4. The third lens group LG3 converges the light flux converged by the second lens group LG2 and passing through the first stop S1 toward the second stop S2.

An infrared cut filter CF is disposed between the second lens group LG2 and the first stop S1. In a photometric/colorimetric device or the like in which an optical path is branched into a plurality of paths by the light guiding member 22 as in the present embodiment, the light receiving section 11 (light receiving elements or light receiver(s)) has sensitivity in the wavelength region of infrared rays too. Therefore, in a photometric/colorimetric device that deals with only the visible light region, it is necessary to cut infrared rays in front of the light receiving section 11 with the infrared cut filter CF. The position of the infrared cut filter CF is not particularly limited, but it is more preferable to arrange the infrared cut filter CF in a region where the light flux diameter is small from the viewpoint of miniaturization.

The first stop S1 is an optical member that defines a measurement diameter, and is, for example, a plate-like member having a circular opening corresponding to the measurement diameter. The first stop S1 is arranged in the vicinity of a focal point of the third lens group LG3 on the object side (hereinafter, this arrangement may be referred to as "ideal arrangement"). In this embodiment, one being arranged/disposed "near" or "in the vicinity of" a focal point means that although it is ideal to be arranged at the focal point in paraxial optics, the one is arranged at an optimum position near the focal point according to a residual aberration in an actual optical system.

The second stop S2 is disposed in the vicinity of a position conjugate with the focal point f1 on the image side (light guiding member 22 side) of the first lens group LG1 with respect to the second lens group LG2 and the third lens group LG3. That is, the second stop S2 is disposed near the second focal point of the entire measurement optical system 20 (lens unit 21). The first focal point of the entire measurement optical system 20 is the focal point f1 of the first lens group LG1. In this embodiment, one being arranged/disposed "near" or "in the vicinity of" a focal point means that although it is ideal to be arranged at the focal point in paraxial optics, the one is arranged at an optimum position near the focal point according to a residual aberration in an actual optical system. The second stop S2 may be a plate-like member having an opening similarly to the first stop S1, or (the diameter of) the incident plane of the light guiding member 22 may serve as the second stop S2.

In the measurement optical system 20 configured as described above, first, the first lens group LG1 condenses light (light flux) taken in from the measurement target plane SM, near the focal point f1 of the first lens group LG1. The light condensed on the focal point f1 by the first lens group LG1 spreads after passing through the focal point f1. The second lens group LG2 converges the spread light toward the first stop S1. The light that has passed through the first stop S1 is converged toward the second stop S2 by the third lens group LG3.

At the time, since the first stop S1 and the measurement target plane SM are in a conjugate relationship with each other, if there is brightness unevenness on the measurement target plane SM, similar light amount unevenness occurs at each point on the aperture plane of the first stop S1. However, since the third lens group LG3 guides the light flux emitted from the respective points of the first stop S1 so as to spread over the entire second stop S2, the influence of the brightness unevenness of the measurement target plane SM can be suppressed.

In addition, the first stop S1 is disposed in the vicinity of the focal point of the third lens group LG3 on the object side (ideal arrangement). Therefore, the light emitted from each point of the first stop S1 is incident on the second stop S2 (light guiding member 22) at the same angle. That is, the light emitted from the center of the first stop S1 is perpendicularly incident on the second stop S2. Further, the light emitted from the outermost peripheral portion of the first stop S1 is incident on the second stop S2 at the largest angle with respect to the axial line perpendicular to the optical axis Ax.

Since the light guiding member 22 has a limitation on the angular range of light rays that can be taken in, this ideal arrangement is suitable for more efficiently collecting light into the light guiding member 22.

Figures 3, 4:
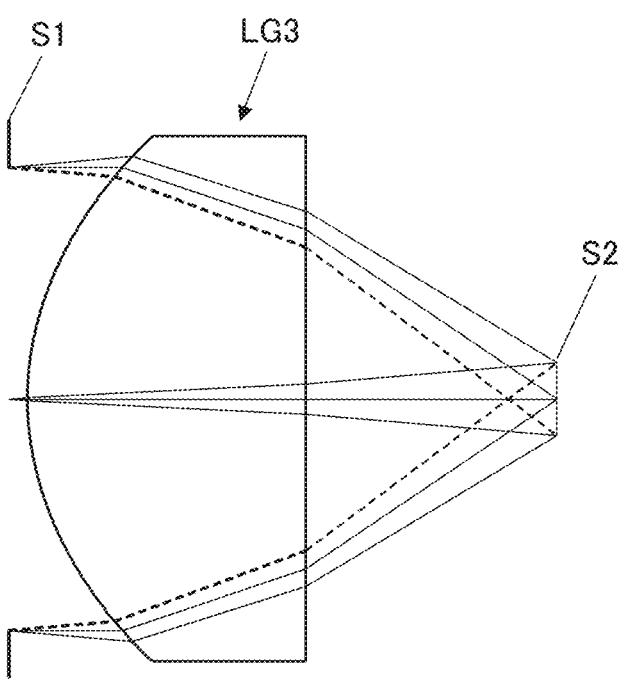
FIG. 3 illustrates an angle at which light from a first stop is incident on a second stop via a third lens group according to the first embodiment.
FIG. 4 is a table showing the focal length of each lens group in a lens unit according to the first embodiment, a second embodiment and a third embodiment.

If the arrangement is not the ideal arrangement, as shown in FIG. 3, the light emitted from each point of the first stop S1 has a different incident angle depending on the position at which the light is incident on the second stop S2 (light guiding member 22). Under the condition that the opening angle of the light flux incident on the center of the second stop S2 is the same, the light flux (rays) indicated by the broken lines therein is incident on the second stop S2 at a larger angle than in the ideal arrangement. If the angle is larger than the angle of the light rays that can be taken in by the light guiding member 22, the amount of light that can be taken in by the light guiding member 22 decreases as compared with the ideal arrangement.

In this regard, in the present embodiment, the first stop S1 is arranged in the vicinity of the focal point of the third lens group LG3 on the object side. Therefore, it is possible to reduce the light amount loss caused by the off-axis light flux having a large incident angle.

In addition, in the lens unit 21, the absolute value of the lateral magnification of the first stop f1 to a plane conjugate with the first stop S1 with respect to the first lens group LG1 and the second lens group LG2 is 0.7 or less. This lateral magnification is the lateral magnification of the first stop S1 to the measurement target plane SM, namely, the ratio of the opening diameter of the first stop S1 to the measurement diameter of the measurement target plane SM. Provided that the absolute value of the lateral magnification is more preferably 0.65 or less, and even more preferably 0.61 or less. In the lens unit 21 of the first embodiment, the absolute value of the lateral magnification is 0.40.

In the conventional optical system, the lateral magnification of the first stop S1 to the measurement target plane SM is large. Therefore, when the measurement region of the measurement target plane is expanded, the size of the first stop is increased correspondingly. In this regard, in the present embodiment, by making the lateral magnification of the first stop S1 to the measurement target plane SM 0.7 or less, it is possible to avoid the increase in the size of the measurement optical system 20 (lens unit 21).

Further, the lens unit 21 satisfies the following conditional expression (1).

$$F1G/F2G > 1.1 \qquad (1)$$

F1G is the focal length of the first lens group LG1, and F2G is the focal length of the second lens group LG2.

Preferably, the lens unit 21 satisfies the following conditional expression (1a).

$$F1G/F2G > 1.2 \qquad (1a)$$

More preferably, the lens unit 21 satisfies the following conditional expression (1b).

$$F1G/F2G > 1.3 \qquad (1b)$$

Even more preferably, the lens unit 21 satisfies the following conditional expression (1c).

$$F1G/F2G > 1.4 \qquad (1c)$$

In the lens unit 21 of the first embodiment. F1G/F2G=2.52.

The conditional expression (1) defines that the refractive power of the second lens group LG2 is larger than the refractive power of the first lens group LG1. By satisfying the conditional expression (1), it is possible to appropriately guide the light taken in from the measurement target plane SM to the first stop S1 which has a conjugate relationship with the measurement target plane SM and is a region smaller than the measurement target plane SM. That is, the measurement optical system 20 (lens unit 21) can be suitably miniaturized.

Further, the lens unit 21 satisfies the following conditional expression (2).

$$F2G/F3G > 1.1 \qquad (2)$$

F2G is the focal length of the second lens group LG2, and F3G is the focal length of the third lens group LG3.

Preferably, the lens unit 21 satisfies the following conditional expression (2a).

$$F2G/F3G > 1.3 \qquad (2a)$$

More preferably, the lens unit 21 satisfies the following conditional expression (2b).

$$F2G/F3G > 1.4 \qquad (2b)$$

Even more preferably, the lens unit 21 satisfies the following conditional expression (2c).

$$F2G/F3G > 1.5 \qquad (2c)$$

In the lens unit 21 of the first embodiment, F2G/F3G=2.15.

The conditional expression (2) defines that the refractive power of the third lens group LG3 is larger than the refractive power of the second lens group LG2. By satisfying the conditional expression (2), it is possible to appropriately guide the light passing through the focal point f1 of the first lens group LG1 to the second stop S2 which has a conjugate relationship with the focal point f1 and is a region smaller than the focal point f1's plane. That is, the measurement optical system 20 (lens unit 21) can be suitably miniaturized.

Figures 5, 6:
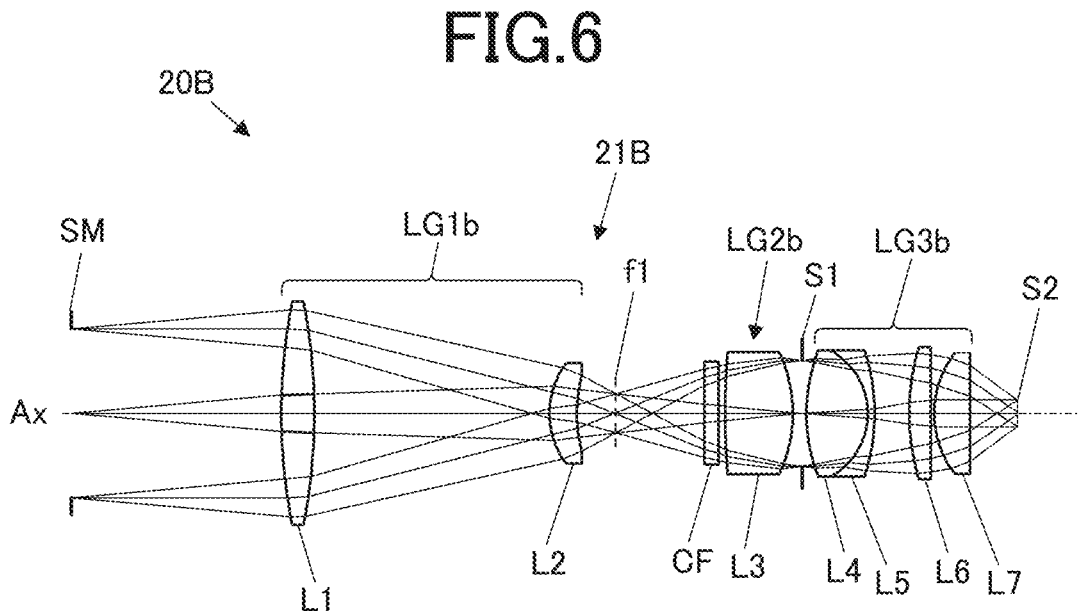
FIG. 5 is a table showing the interval on an optical axis in the case where each lens group in the lens unit according to the first embodiment, the second embodiment and the third embodiment is a thin lens.
FIG. 6 shows a configuration of a measurement optical system according to the second embodiment.

FIG. 4 and FIG. 5 show the focal length of each lens group in the lens unit 21 of the first embodiment and the interval on the optical axis Ax in the case where each lens group is a thin lens.

[Technical Effects of First Embodiment]

As described above, according to the present embodiment, the measurement region of the measurement target plane SM is defined by the first stop S1 which is in a conjugate relationship with the measurement target plane SM. Further, by arranging the second stop S2 at the focal position of the entire measurement optical system 20, the angle of the light rays taken in from the measurement target plane SM is defined. This makes it possible to reduce the light amount loss caused by the off-axis light flux having a large incident angle and improve the light condensation efficiency.

Further, the absolute value of the lateral magnification of the first stop f1 to the plane (measurement target plane SM) conjugate with the first stop S1 with respect to the first lens group LG1 and the second lens group LG2 is 0.7 or less. Therefore, unlike the conventional one in which the absolute value of the lateral magnification is large, it is possible to avoid the increase in the size of the first stop S1 due to the expansion of the measurement region of the measurement target plane SM. Therefore, a larger amount of light can be taken in, and the increase in the size can be suppressed.

Further, according to the present embodiment, the measurement optical system 20 satisfies the conditional expression (1).

This makes it possible to appropriately guide the light taken in from the measurement target plane SM to the first stop S1 which has a conjugate relationship with the measurement target plane SM and is a region smaller than the measurement target plane SM. That is, the measurement optical system 20 (lens unit 21) can be suitably miniaturized.

Further, according to the present embodiment, the measurement optical system 20 satisfies the conditional expression (2).

This makes it possible to appropriately guide the light passing through the focal point f1 of the first lens group LG1 to the second stop S2 which has a conjugate relationship with the focal point f1 and is a region smaller than the focal point f1's plane That is, the measurement optical system 20 (lens unit 21) can be suitably miniaturized.

Further, according to the present embodiment, the first stop S1 is disposed in the vicinity of the focal point of the third lens group LG3 on the object side.

This makes it possible to reduce the light amount loss caused by the off-axis light flux having a large incident angle.

Second Embodiment

FIG. 6 shows a configuration of a measurement optical system 20B according to a second embodiment.

As shown in FIG. 6, the measurement optical system 20B according to the second embodiment is different from the measurement optical system 20 according to the first embodiment in configurations of the first lens group, the second lens group and the third lens group.

In descriptions of embodiments hereinafter, different points in configuration from the measurement optical system 20 of the first embodiment will be mainly described, and descriptions of common points in configuration will be omitted.

To be specific, a lens unit 21B of the measurement optical system 20B includes a first lens group LG1*b*, a second lens group LG2*b*, a first stop S1, a third lens group LG3*b* and a second stop S2 in order from the object side (measurement target object OB side).

The first lens group LG1*b* includes a first lens L1 and a second lens L2 which are convex lenses.

The second lens group LG2*b* includes a third lens L3 which is a convex lens.

The third lens group LG3*b* includes a fourth lens L4 and a fifth lens L5, and a sixth lens L6 and a seventh lens L7 which are convex lenses. The fourth lens L4 and the fifth lens L5 are joined to each other.

The infrared cut filter CF is disposed on the object side of the second lens group LG2*b*.

The arrangement of the first stop S1 and the second stop S2 on the optical axis Ax is the same as that in the first embodiment.

In the lens unit 21B, the absolute value of the lateral magnification of the first stop S1 to the plane conjugate with the first stop S1 with respect to the first lens group LG1*b* and the second lens group LG2*b* is 0.61.

FIG. 4 and FIG. 5 show the focal length of each lens group in the lens unit 21B of the second embodiment and the interval on the optical axis Ax in the case where each lens group is a thin lens.

According to the second embodiment, the same effects as those of the first embodiment can be obtained.

Third Embodiment

Figures 7, 8:
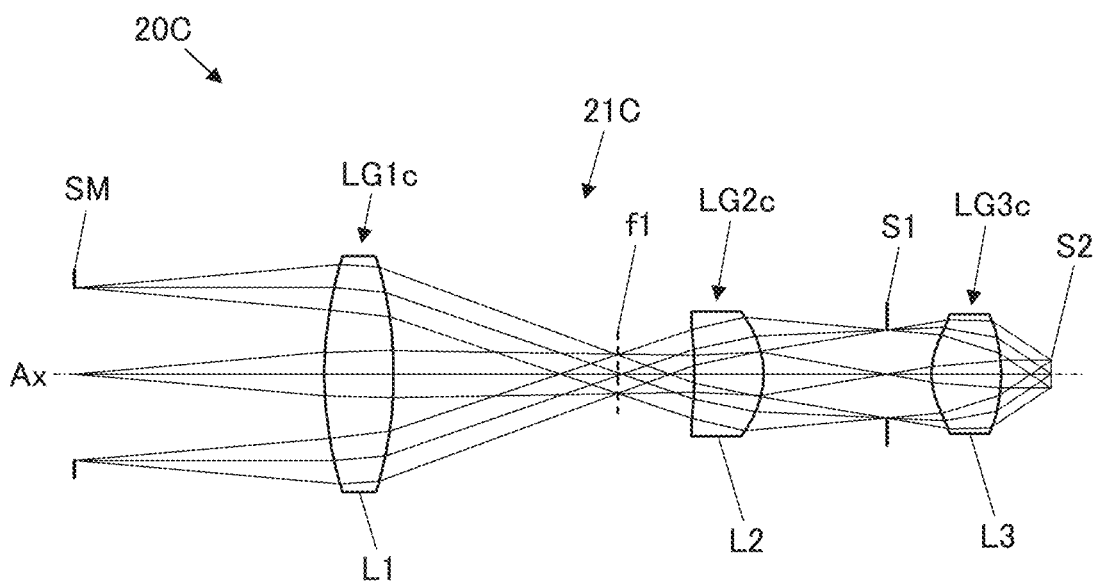
FIG. 7 shows a configuration of a measurement optical system according to the third embodiment.
FIG. 8 shows a configuration of a measurement optical system according to a fourth embodiment.

FIG. 7 shows a configuration of a measurement optical system 20C according to a third embodiment.

As shown FIG. 7, the measurement optical system 20C according to the third embodiment is different from the measurement optical system 20 according to the first embodiment in configurations of the first lens group, the second lens group and the third lens group.

To be specific, a lens unit 21C of the measurement optical system 20C includes a first lens group LG1c, a second lens group LG2c, a first stop S1, a third lens group LG3c and a second stop S2 in order from the object side (measurement target object OB side).

The first lens group LG1c includes a first lens L1 which is a convex lens.

The second lens group LG2c includes a second lens L2 which is a convex lens.

The third lens group LG3c includes a third lens L3 which is a convex lens.

The arrangement of the first stop S1 and the second stop S2 on the optical axis Ax is the same as that in the first embodiment.

In the lens unit 21C, the absolute value of the lateral magnification of the first stop S1 to the plane conjugate with the first stop S1 with respect to the first lens group LG1c and the second lens group LG2c is 0.44.

Further, the basic configuration of the lens unit 21C is the same as those of the first embodiment and the second embodiment, but aspherical lenses are adopted as the convex lenses of the second lens group LG2c and the third lens group LG3c. This achieves a configuration with a minimum number of lenses in which only one convex lens is disposed in each lens group. As the number of lenses is larger, the light amount loss due to reflection at the interface between the lens(es) and the air increases. That is, the light amount loss can be suppressed by reducing the number of lenses.

FIG. 4 and FIG. 5 show the focal length of each lens group in the lens unit 21C of the third embodiment and the interval on the optical axis Ax in the case where each lens group is a thin lens.

According to the third embodiment, the same effects as those of the first embodiment can be obtained.

Further, the number of lenses can be reduced by adopting aspherical lenses for the second lens group LG2c and the third lens group LG3c. Consequently, the light amount loss due to reflection at the interface between the lens(es) and the air can be suppressed.

Fourth Embodiment

FIG. 8 shows a configuration of a measurement optical system 20D according to a fourth embodiment.

As shown in FIG. 8, the measurement optical system 20D according to the fourth embodiment is different from the measurement optical system 20 according to the first embodiment in that an ND filter (Neutral Density Filter) 25a is provided.

In the lens unit 21D of the measurement optical system 20D, the ND filter 25a is disposed between the third lens group LG3 and the second stop S2. The ND filter 25a is supported so as to be insertable and removable. The position of the ND filter 25a is not particularly limited, but it is more preferable to dispose the ND filter 25a in a region where the light flux diameter is small from the viewpoint of miniaturization.

According to the fourth embodiment, the same effects as those of the first embodiment can be obtained.

Further, providing the ND filter 25a makes it possible to appropriately measure a higher luminance region.

That is, since the measurement optical system (lens unit) according to the present embodiment can take in a larger amount of light, it is suitable as a photometric/colorimetric device for a low luminance region. However, in a high luminance region, an allowable value of the amount of light that cab be taken/received by the light receiving element may be exceeded. Therefore, by inserting the ND filter 25a, it becomes possible to perform photometry and colorimetry in a higher luminance region without changing the spectral distribution of the taken-in light flux. Further, by arranging the ND filter 25a such that it can be inserted and removed, it is possible to widen the measurement range as compared to the conventional one.

Needless to say, the ND filter 25a can be disposed similarly in the second embodiment or the third embodiment.

Fifth Embodiment

Figure 9:
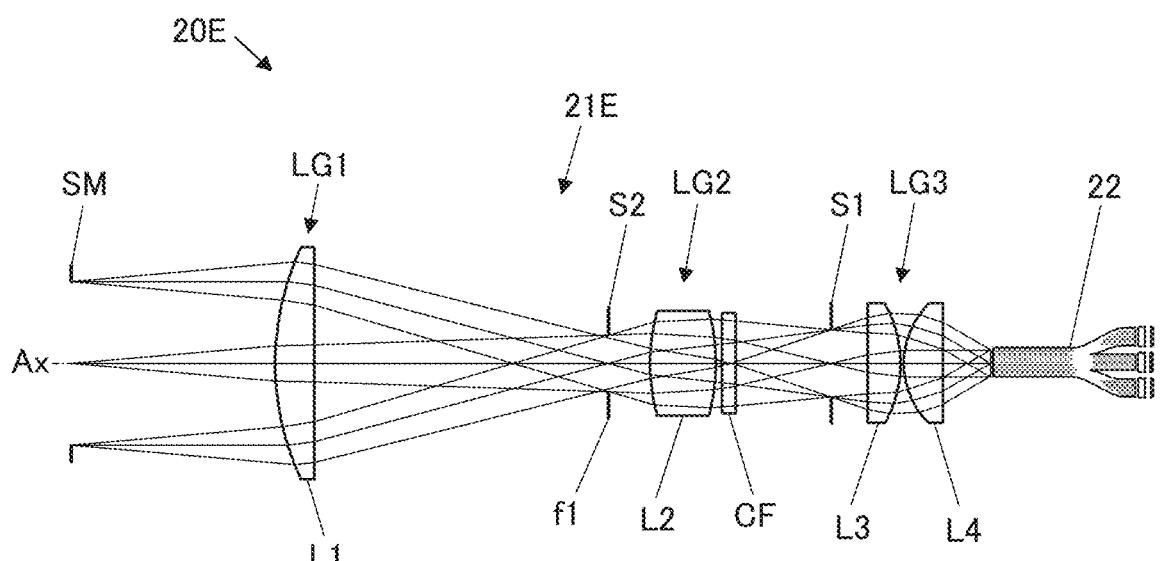
FIG. 9 shows a configuration of a measurement optical system according to a fifth embodiment.

FIG. 9 shows a configuration of a measurement optical system 20E according to a fifth embodiment.

As shown in FIG. 9, the measurement optical system 20E according to the fifth embodiment is different from the measurement optical system 20 according to the first embodiment in the position of the second stop S2.

To be specific, in a lens unit 21E of the measurement optical system 20E, the second stop S2 is arranged near the focal point f1 of the first lens group LG1. The second stop S2 in this case is a plate-like member having a circular opening.

According to the fifth embodiment, the same effects as those of the first embodiment can be obtained.

That is, according to the present embodiment, the second stop S2 is arranged in the vicinity of the image-side focal point LG1 of the first lens group f1. That is, as compared with the position of the second stop S2 in the first embodiment, the second stop S2 is disposed in the vicinity of a position which is in a conjugate relationship with respect to the second lens group LG2 and the third lens group LG3. Therefore, the angle of the light rays taken in from the measurement target plane SM can also be defined by the second stop S2.

Needless to say, the second stop S2 can be moved similarly in the second embodiment or the third embodiment. Further, the second stop S2 may be disposed both in the vicinity of the focal point f1 on the image side of the first lens group LG1 and in the vicinity of the position having a conjugate relationship with the focal point f1.

[Others]

Although embodiments of the present invention have been described above, embodiments to which the present invention can be applied are not limited to the above-described embodiments, and the above-described embodiments can be appropriately modified without departing from the scope of the present invention.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese Patent Application No. 2023-113008, filed on Jul. 10, 2023, including description, claims, drawings and abstract is incorporated herein by reference.

What is claimed is:

1. A measurement optical system comprising: in order from an object side, a first lens group including at least one lens and having a positive refractive power;

a second lens group including at least one lens and having a positive refractive power;

a first stop; and a third lens group including at least one lens and having a positive refractive power;

wherein the measurement optical system further comprises a second stop disposed at least one of (i) in vicinity of a position of a focal point of the first lens group on an image side and (ii) in vicinity of a position conjugate with the focal point of the first lens group on the image side with respect to the second lens group and the third lens group, and wherein an absolute value of a lateral magnification of the first stop to a plane conjugate with the first stop with respect to the first lens group and the second lens group is 0.7 or less.

2. The measurement optical system according to claim 1, wherein the measurement optical system satisfies a conditional expression below:

$$F1G/F2G > 1.1 \tag{1}$$

where F1G represents a focal length of the first lens group, and F2G represents a focal length of the second lens group.

3. The measurement optical system according to claim 1, wherein the measurement optical system satisfies a conditional expression below:

$$F2G/F3G > 1.1 \tag{2}$$

where F2G represents a focal length of the second lens group, and F3G represents a focal length of the third lens group.

4. The measurement optical system according to claim 1, wherein the first stop is disposed in vicinity of a focal point of the third lens group on the object side.

5. The measurement optical system according to claim 1, further comprising an infrared cut filter.

6. The measurement optical system according to claim 1, further comprising a neutral density filter.

7. The measurement optical system according to claim 1, further comprising a light guiding member that is disposed on the image side of the vicinity of the position conjugate with the focal point of the first lens group on the image side with respect to the second lens group and the third lens group, and guides light incident on the second stop.

8. A photometric/colorimetric device comprising:

the measurement optical system according to claim 1;

a color filter that filters light guided by the measurement optical system;

a light receiver that photoelectrically converts the light filtered by the color filter; and a hardware processor that obtains a color and a luminance of a measurement target object based on an electric signal output from the light receiver.

* * * * *